July 27, 1954 N. T. WILBURN 2,684,989
ZINC-SILVER PEROXIDE DUNK-PILE BATTERY
Filed May 4, 1953

INVENTOR.
NICHOLAS T. WILBURN
BY
Harry M. Saragovitz
ATTORNEY

Patented July 27, 1954

2,684,989

UNITED STATES PATENT OFFICE 2,684,989

ZINC-SILVER PEROXIDE DUNK-PILE BATTERY

Nicholas T. Wilburn, Wanamassa, N. J., assignor to the United States of America as represented by the Secretary of the Army Application May 4, 1953, Serial No. 353,027

4 Claims. (Cl. 136—112)

(Granted under Title 35, U. S. Code (1952), sec. 266)

The invention described herein may be manufactured and used by or for the Government for governmental purposes without the payment of any royalty thereon.

This invention relates to improved structures of multiple cell zinc-silver peroxide, dunk-pile type batteries adapted for quick activation by dunking into an alkaline electrolyte.

Zinc-silver peroxide batteries are finding new and important uses in electronic equipment particularly as meteorological or "one-shot" batteries because they provide a large watt output per unit of weight and volume during discharge and because the current is delivered at a nearly constant voltage. Since silver batteries may be discharged at very high rates they are well adapted to continue discharge within a relatively short period of time. They may be kept dry for indefinite periods and activated just before they are needed for service.

Such lightweight, deferred action, dunk-pile type batteries using the electrolytical system zinc-silver peroxide-potassium hydroxide consist in known manner of a pile of flat cell units separated by thin, liquid-tight, conductive intercell walls that electrically connect the positive electrode of one cell with the negative electrode of the neighboring cell. The pile of flat cells is aligned in a frame or hull that peripherally surrounds the pile assembly holding the cells together while leaving top and bottom of the cells open, or at least partly open. Such a battery is activated by "dunking" that is by immersing the same for a short time in a liquid electrolyte.

In view of the fact that batteries of the "one-shot" type usually are either lost or discarded after a single use and because the cost of silver electrodes are considerable "one shot" batteries, using silver electrodes are not very economical. It is an object of this invention to improve the structure of a zinc-silver peroxide battery so as to reduce the cost of such batteries and at the same time also reduce their weight by providing a specially constructed conductive intercell wall which carries the appropriate amounts of active material for the positive electrode of one cell on one side and the silver peroxide for the negative electrode of the neighboring cell on the other side. The new intercell wall thus constitutes also the grids for two electrodes.

It is a further object of the invention to prevent intercell creepage of electrolyte by constructing the intercell walls in such a manner that in assembling the same a multiple cell battery is formed in which the openings of each cell are provided alternately in the top of one cell and the bottom of the neighboring cell.

These and other objects of the invention will become more apparent from the following description and accompanying illustration of specific embodiments of the inventive idea.

Figure 1:
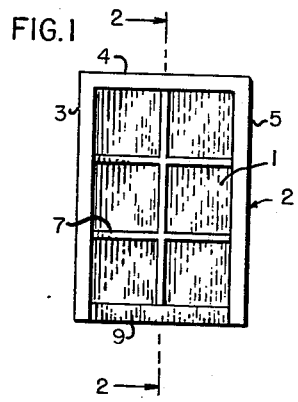
Fig. 1 is an elevational view of an intercell wall according to the invention.
Figure 2:
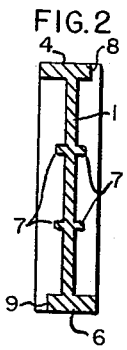
Fig. 2 is a cross-sectional view of Fig. 1 taken along the lines 2—2.
Figure 3:
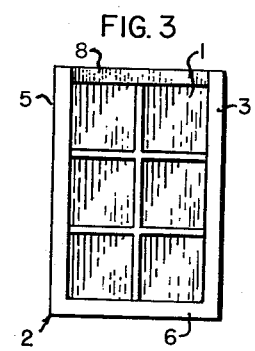
Fig. 3 is an elevational view taken from the right side of Fig. 2, showing the side of the intercell wall opposite from that shown in Fig. 1.

The intercell wall shown in Figs. 1, 2 and 3 consists of a thin, flat metal plate 1, consisting preferably of magnesium, or any other metal which is inert to the electrochemical reactions occurring in the cell. Plate 1 is inclosed in a frame structure 2 that extends perpendicularly beyond both surfaces of the plate 1 so as to form box-like containers for the electrodic materials which are to be deposited on both surfaces of the plate 1. The frame structure 2 consists of four segments 3, 4, 5 and 6. On the one surface of the plate the segments 3, 4 and 5 extend outwardly to an equal distance while the segment 6 extends outwardly to a lesser degree. On the other surface of the plate the segments 3, 6 and 5 extend outwardly to an equal distance while the segment 4 extends to a lesser degree. The two smaller extensions 8 and 9 of segments 6 and 4 thus lie not only on opposite surfaces but also on opposite sides of the plate 1. Both sides of the plate 1 carry ribs 7 forming a web or pocket structure to facilitate the adherence of the electrodic materials to the plate 1.

In the battery according to the present invention zinc is employed as the negative active material and silver peroxide as the depolarizer material. One side of the intercell wall serves as a grid for the positive electrode of one cell and the other side of the intercell wall serves as a grid for the negative electrode of the neighboring cell. Both the zinc and the silver peroxide are applied to the respective sides of the intercell wall in any one of several different and well known ways.

For the purposes of the present invention it has been found preferable to prepare the zinc electrode by making a paste of finely divided zinc powder with water. If a binder as for instance polystyrene or methyl cellulose is used the paste may best be made with a 1 per cent solution of such binders in benzene or toluene. The zinc powder paste is applied to one side of the intercell wall and the intercell wall may then be dried at 100° C. or below. The finer the zinc powder used the more reactive the electrode will be.

An advantageous method of preparing the silver peroxide electrode consists in mixing silver peroxide powder with a 1 per cent solution of sodium carboxy methyl cellulose in water and pasting this mixture into the pockets of the remaining side of the intercell wall. The pasted intercell wall is then again submitted to a drying operation.

Figure 4:
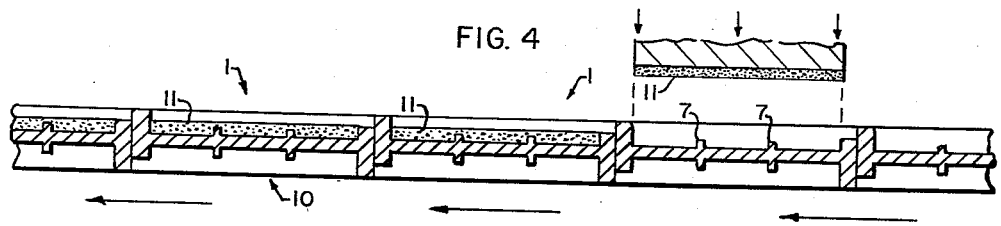
Fig. 4 shows schematically a moving belt on which several intercell walls are placed horizontally for the purpose of receiving the electrodic material.

The intercell wall according to the present invention lends itself easily to mass production. For such purposes the magnesium intercell walls (which may be cast or pressed) are arranged in proper positions on a moving belt 10 as shown in Fig. 4 and run thru a machine which compresses zinc paste 11 into the web structure of one side of the intercell walls. The moving belt then carries the intercell walls containing zinc paste thru an oven to submit the zinc paste to a drying operation. The intercell walls carrying the finished negative electrode are then put back on a moving belt to receive on the opposite surface the silver peroxide paste and are then submitted to another drying operation to remove the moisture from the silver peroxide paste. The intercell wall according to the invention now carries on one surface the zinc electrode of one cell and on the opposite surface the silver peroxide electrode for the neighboring cell. Mercury amalgamation may be used for the zinc electrode but is not necessary unless the battery is to be activated with the electrolyte a considerable time before the discharge is begun.

Figure 5:
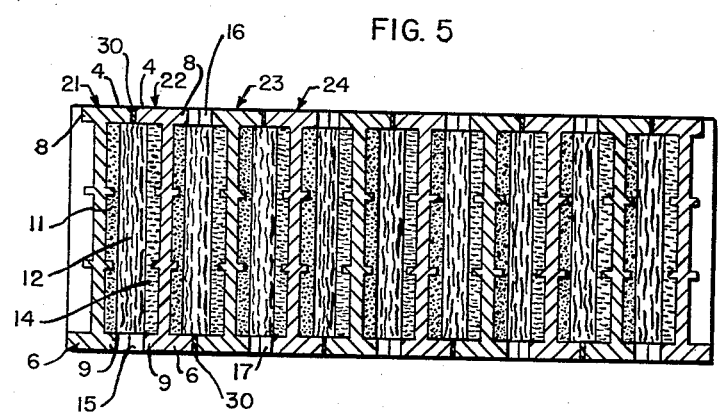
Fig. 5 shows an assembled dunk-pile type battery having intercell walls according to the invention.

The finished intercell walls are lined up and assembled into a battery as shown in Fig. 5.

Starting from left to right the first intercell wall 21 is brought into a position in which the small extension 8 of the segment 4 points to the left while the small extension 9 of segment 6 points to the right. The right hand surface of the intercell wall 21 carries the negative zinc electrode 11. A spacer 12 of bibulous, electrolyte retaining material is inserted between the intercell wall 21 and the adjoining intercell wall 22 which is brought into a position in which the small extension 8 of segment 4 points to the right while the small extension 9 of segment 6 points to the left. The left hand surface of the intercell wall 22 carries the positive silver peroxide electrode 14, while its right hand surface carries the negative zinc electrode of the adjacent cell. The adjoining ends of the two segments 4 of the intercell walls 21 and 22 are glued together with an appropriate non-conductive adhesive 30. In this very simple manner a complete cell is formed which due to the special structure of the intercell walls possesses a cell opening 15 in the bottom of the first cell.

The right hand surface of the intercell wall 22 carries another negative electrode 11 and by adding another spacer and a third intercell wall 23 in appropriate positions a second cell is formed and this is continued until the desired number of cells has been built up to a battery. Due to the special structure of the intercell walls the second cell has its opening at the top of the cell, that is, opposite the opening in the first cell, the third cell will have its opening at the bottom and so forth. Thus the cell openings will be spatially staggered from one cell to the other as disclosed in my copending application Serial No. 346,056, filed March 31, 1953. This special arrangement has the particular advantage to decrease the creeping of electrolyte by forcing the same to creep at least over the width of one complete cell rather than from one cell over the thin intercell wall into the neighboring cell. In the present case this advantage is attained in simplest manner by a special form of the intercell wall according to the invention.

The new intercell wall may consist of any conductive and liquid-tight material other than magnesium provided such material does not interfere with the function of the cell; such material must be impermeable to the electrolyte used, it must be a good electrical conductor and must not be affected by the chemical and electrochemical reactions that are going on in the cell. The intercell wall may also consist of conductive plastics.

The spacer 12 conventionally consists of paper, wood pulp, microporous rubber, glass wool, rayon felt, webril, or other liquid-retaining inert materials. The thickness of the spacer 12 is designed to soak up enough electrolyte to allow complete utilization of the active materials of the electrodes.

The finished battery made with intercell walls according to the invention is activated in the usual manner by dunking into the conventional electrolyte comprising potassium hydroxide or other alkaline electrolytes and is then ready for use.

While the invention is described in connection with specific embodiments it is obvious to those skilled in the art that numerous variations and alterations are conceivable within the scope of the inventive idea as defined by the appended claims.

What is claimed is:

1. In a dunk pile type battery comprising a pile of thin, flat cells each of said flat cells comprising a zinc negative electrode, a silver peroxide positive electrode, a spacer of bibulous electrolyte retaining material between said electrodes and conductive intercell walls of liquid-tight material between the cells characterized in that said intercell walls consist of a metal plate inclosed in a frame structure that extends perpendicularly beyond both surfaces of the plate so as to form a box-like container on one surface of the intercell wall for the negative electrodic material of one cell and another box-like container on the other surface of the intercell wall for the positive electrodic material of the adjacent cell, said frame structure consisting of four segments one of these segments on both surfaces of the plate extending outwardly to a lesser degree than the other segments.

2. A dunk-pile type battery according to claim 1 in which the segments that extend outwardly to a lesser degree are positioned on opposite sides of said plate.

3. A dunk-pile type battery according to claim 1 in which said metal plate carries ribs forming pockets to facilitate the adherence of the electrodic material to said plate.

4. A dunk-pile type battery according to claim 1 in which the silver peroxide electrode contains not more than 1 per cent of carboxy methyl cellulose.

References Cited in the file of this patent

UNITED STATES PATENTS

| Number | Name | Date |
|---|---|---|
| 2,349,763 | Seltzer | May 23, 1944 |
| 2,594,710 | Andre | Apr. 29, 1952 |
| 2,620,369 | Daniel | Dec. 2, 1952 |

OTHER REFERENCES

Characteristics of the Silver Oxide-Zinc-Alkali Primary Cell, Electro-Chemical Society paper by White, Pierce and Dirkse, Preprint 90-20, presented Oct. 1946, pages 273-4.